United States Patent [19]

Howard et al.

[11] Patent Number: 5,833,592
[45] Date of Patent: Nov. 10, 1998

[54] METHOD AND APPARATUS FOR ENHANCING SEAM UNIFORITY IN SPIRALLY WOUND TUBES

[75] Inventors: David Howard, Merzenich, Germany; Jean Paul Languillat, Valliers-Fleurigny, France; Johannes Wilhelmus van de Camp, Meerssen, Netherlands

[73] Assignee: Sonoco Products Company, Hartsville, S.C.

[21] Appl. No.: 682,094

[22] Filed: Jul. 17, 1996

[51] Int. Cl.⁶ ....................................................... B31C 3/00
[52] U.S. Cl. ............................................. 493/301; 493/302
[58] Field of Search ................................... 493/297, 299, 493/301, 302, 303, 304

[56] References Cited

U.S. PATENT DOCUMENTS

| | | |
|---|---|---|
| 941,255 | 11/1909 | Jenkins . |
| 982,430 | 1/1911 | Jenkins . |
| 984,002 | 2/1911 | Jenkins . |
| 1,582,079 | 4/1926 | Parsons . |
| 2,336,540 | 12/1943 | Graves . |
| 2,405,909 | 8/1946 | Smith et al. . |
| 2,922,343 | 1/1960 | Dunlap, Jr. et al. . |
| 3,033,736 | 5/1962 | Aherg . |
| 3,150,575 | 9/1964 | Couzens et al. . |
| 3,533,883 | 10/1970 | Gartaganis ............................. 493/297 |
| 3,548,724 | 12/1970 | Hall ........................................ 493/297 |
| 3,863,551 | 2/1975 | Murphy . |
| 4,473,368 | 9/1984 | Meyer . |
| 5,425,693 | 6/1995 | Gardner et al. . |
| 5,556,365 | 9/1996 | Drummond ............................. 493/287 |

FOREIGN PATENT DOCUMENTS

| | | |
|---|---|---|
| 462320 | 4/1973 | Australia . |
| 402 859 | 10/1909 | France . |
| 240 772 | 8/1909 | Germany . |

Primary Examiner—Jack W. Lavinder
Attorney, Agent, or Firm—Bell Seltzer Intellectual Property Law Group of Alston & Bird LLP

[57] ABSTRACT

The invention provides a method and apparatus for spirally winding a tube of enhanced spiral seam uniformity that is simple and reliable. The spirally wound tube is formed using a spiral pitch control surface that engages with an exterior or interior cylindrical surface of a spirally wound tube and constrains movement of the tube to a predetermined spiral rotation as it is formed on a cylindrical stationary mandrel. Preferably, the pitch control surface comprises a tube engaging surface positioned along at least one spirally aligned portion of the exterior portion of the tube forming mandrel.

40 Claims, 3 Drawing Sheets

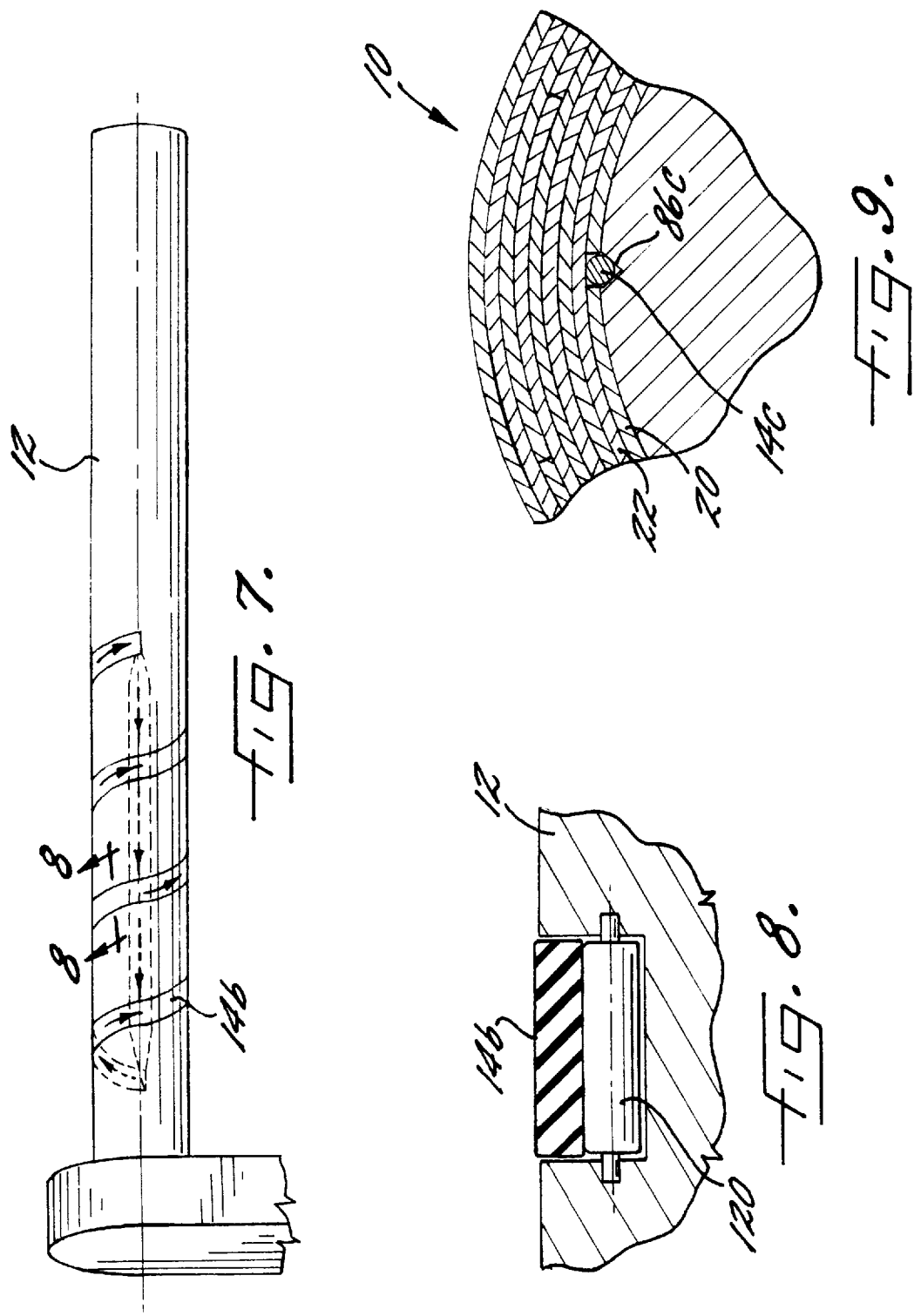

METHOD AND APPARATUS FOR ENHANCING SEAM UNIFORITY IN SPIRALLY WOUND TUBES

FIELD OF THE INVENTION

The invention relates to a method and apparatus for manufacturing spirally wound rigid tubes, from paperboard, plastic film, metal foil, or similar sheet materials. More particularly, the invention relates to a method and apparatus for enhancing uniformity of the spiral seam in spirally wound tubes that are preferably formed from sheet materials including paperboard plies.

BACKGROUND OF THE INVENTION

Spirally wound paperboard tubes and paperboard composite tubes (tubes having one or more layers of paper and/or non-paper sheet material such as plastic, foil or the like), are used in a wide variety of applications throughout numerous industries. For example, spirally wound tubes are used as winding cores for winding filamentary materials such as yarns, threads and the like, and for winding of various sheet materials including paper, synthetic films, cloth, and other materials. Spirally wound tubes are also used as containers for food products such as frozen juices, bread doughs, and snack products; and as forms in the building industry, e.g., for forming concrete columns and the like.

Spirally wound tubes are traditionally formed by winding continuous plies of paperboard or other sheet material around a stationary mandrel. A plurality of strips or plies are fed onto the exterior of the mandrel in a radially layered relationship. Each of the plies is wound spirally onto the mandrel or onto an underlying ply so that the leading edge of each ply is positioned in contact with or adjacent the trailing edge of a preceding portion of the ply and so that each ply forms a radial layer of the tube. The individual plies are coated on one or both faces with a glue so that each layer is adhered to each radially adjacent layer to form a cylindrical tube wall. A rotating belt contacts the exterior of the layered tube as it is being formed on the mandrel and rotates the tube so that it moves spirally down the mandrel as it is being formed.

For various reasons, it is highly desirable to precisely control the relationship between the leading and trailing edges of the plies which define the spiral seam in the layers of the tube. If the leading and trailing edges of the ply are spaced from each other, a ply gap is formed which can adversely affect the strength and/or appearance of the tube. Similarly, uncontrolled overlapping of these edges can be highly undesirable. When the tubes are used as winding cores for film, paper or other thin sheet material, a gapped spiral seam or overlapped spiral seam on the exterior of the tube can adversely affect the appearance or quality of the sheet material wound onto the tube. In instances when the sheet material is wound tightly onto the tube, a gapped or overlapped spiral seam in an interior layer of the tube can also adversely affect the sheet material because of soft or hard spots caused by the seams. For similar reasons, spiral ply gaps are also undesirable in textile winding cores. In the food industry, spiral wound containers often contain exterior labels which are applied as the final spiral layer of the tube. In this case, it can be highly desirable to have a uniform registration between the leading and trailing edges of the ply because of printed instructions and/or patterns on the exterior, label layer of the tube.

Nonuniform spiral seams can be undesirable in the interior or intermediate layers of a spirally wound tube because of ply wrinkling that can result from the uneven seam and because uneven tension across a ply can harm adhesion of the ply to its adjacent outer or inner layer. Nonuniform spiral seams also can cause the tube to have a non-uniform strength along its length. In those instances when the inside layer of the tube includes a printed surface, or when the smoothness of the of the inside layer is important, e.g., when the tube is used to form a concrete column, nonuniform spiral seams are also highly undesirable.

For these and other reasons, careful attention is generally given to the spiral seam during the spirally wound tube manufacturing process. However, the seam uniformity is known to be difficult to control with precision because of numerous factors involved in the tube manufacturing process. These factors include variations in tension or construction of the winding belt, variations in the raw materials used in forming the tube or in the force of the motor driving the belt; adjustments by the operator in the speed of the manufacturing process, changes in the force required to pull the plies of paperboard or other material onto and along the mandrel due to irregularities in the ply or the feeding mechanism for the ply, changes in friction between the innermost layer of the tube and exterior of the forming mandrel; bending and other deformations of the winding mandrel or the drums supporting the winding belt; downstream forces which are applied to the tube such as the force from saws used to cut the tube into segments which can apply tensile or compressive forces along the length of the tube if the saw is not moved axially at precisely the same speed as the tube; and changes in the mass of the tube as tube sections are periodically cut from the end of the tube. The net result of any of these varying forces can be that the tube is moved down the mandrel at a varying rate with the result that nonuniform gaps can result between the adjacent edges of a ply in a single or multiple layers of the tube, and/or radial gaps can be formed between the radial layers of the tube.

The problem of nonuniform spiral seams has been addressed in various different ways as illustrated in the art. For example, U.S. Pat. No. 941,255 issued Nov. 23, 1909 to Jenkins employs a plurality of rollers mounted on the surface of the tube forming mandrel and a paper ply feeding mechanism which is mounted for axial movement with respect to the mandrel in order to overcome irregular movement of the winding belt. This is said to allow for variations in the position of the winding belt with respect to the tube forming mandrel by automatically adjusting the axial position of the ply feeding guide along the mandrel in response to such variations.

U.S. Pat. No. 3,150,575 issued Sep. 29, 1964 to Couzens et al. discloses a method for improving the uniformity of spirally wound paperboard tubes by employing two "eyes" or sensors which are spaced and monitor the spiral seam on the tube exterior at two spaced, spirally corresponding downstream locations. Any variations in the two corresponding seam locations, when detected, initiate adjustment of the helical lead or pitch of the wound tube by adjustment of the angle of inclination of the winding belts which wind the tube onto and along the mandrel.

U.S. Pat. No. 4,473,368, issued Sep. 25, 1984 to Meyer proposes a paper ply feeding mechanism which is supported on a frame that is rotatable with respect to the stationary mandrel. The spiral winding angle of the paper strips with respect to the axis of the mandrel is monitored during the tube manufacturing process and the so-called "pay out" or feed angle of the paper plies with respect to the mandrel is varied in response to any changes in the winding angle.

U.S. Pat. No. 5,425,693 to Gardner is directed to a method and apparatus for making spirally wound sleeves for printing cylinders wherein independently controllable motors are used to drive the drive belt that winds adhesive coated tapes onto a stationary forming mandrel in order to enhance control of the winding angle. The force and torque transmission of each motor is said to be independently controllable. In addition, the widths of the individual tapes can be slit on-line near the point of winding in order to precisely control the spiral gaps. The on-line slitting is controlled in response to a video camera which monitors the gap on the outer surface of the tube.

Despite these and other proposals to precisely control the spiral seam on paperboard and other spirally wound tubes, spiral seam uniformity remains a concern throughout the industry. This is particularly true when a high degree of precision is desirable. Although the above apparatus and methods and/or other known apparatus and methods can be used to control spiral seam uniformity with some degree of precision, the cost, complexity and reliability of the various methods and apparatus which are used for this purpose are such that there is no practical and reliable method and/or apparatus for ensuring spiral seam uniformity that is accepted throughout the industry, despite decades of experience in the manufacture of such tubes.

SUMMARY OF THE INVENTION

The present invention provides a method and apparatus for enhancing the spiral seam uniformity of a spirally wound tube that is simple and reliable. The method and apparatus of the invention can provide rigid spiral wound tubes with highly uniform construction and appearance while reducing reliance on operator skills which can vary from operator to operator and from manufacturing shift to manufacturing shift. The method and apparatus of the invention can desirably minimize the impact of winder and belt quality variations on the uniformity of the wound tube and can decrease the precision of winder adjustment required in conventional tube forming processes for controlling tube uniformity in the conventional spiral winding process.

In accordance with the invention, a spirally wound tube of substantially constant exterior and interior diameter and having enhanced spiral seam uniformity is formed using a spiral pitch control surface that engages with an exterior or interior surface of the tube and constrains movement of the tube to a predetermined spiral rotation as the tube is formed on a stationary cylindrical mandrel. Preferably, the tube engaging pitch control surface is a surface formed on, or positioned along, at least one exterior, spirally aligned portion of the tube forming mandrel. The tube engaging surface is preferably at least one continuous, spirally aligned linear protrusion along an exterior portion of the mandrel, but may constitute a plurality of spirally aligned discreet protrusions on the mandrel surface, or a spirally aligned linear depression on the mandrel surface. The pitch control surface engages a surface of the tube as the tube rotates on the mandrel so that the movement of the tube along the mandrel surface is substantially constrained to spiral rotation corresponding to the spiral alignment of the pitch control surface.

In one preferred embodiment, a spiral thread-like surface is formed on the mandrel surface and extends sufficiently along the length of the mandrel surface to form one or more flights of spiral thread-like protrusions. The flights are aligned at a uniform spiral angle and spaced at a fixed pitch, i.e., the axial distance resulting from one revolution along the spiral path. This causes the interior surface of the tube, as it is being formed, to positively engage the exterior surface of the mandrel and to rotate along the surface of the mandrel like an elongate threaded nut rotating along a threaded rod. The spiral thread-like surface or surfaces on the mandrel thus compel and limit, i.e., constrain, movement of the tube to spiral rotation along a spiral path corresponding to the spiral thread-like pitch control surface.

In one advantageous embodiment of the invention, the pitch control surface is formed on the surface of a mandrel extension which can be attached at the downstream end of a conventional mandrel. This allows pitch control surfaces of varying spiral wind angles, that is, of varying pitches, to be applied to a single tube forming mandrel in order to accommodate the manufacture of tubes from different ply widths on the same mandrel by use of different mandrel extensions. Alternatively, the pitch control surface can be formed on the mandrel surface by a permanently attached or removeably attached exterior sleeve or partial sleeve that is applied to the surface of the mandrel, or by forming a pitch control surface on or in the surface of the mandrel.

In one advantageous method embodiment of the invention, a spirally wound tube is formed using the pitch control apparatus of the invention wherein at least a portion of the pitch control surface is located on the mandrel downstream of the winding belt. The final, exterior ply layer is applied to the surface of the tube at or adjacent the location of the pitch control surface downstream of the winding belt. Because the spiral rotation of the tube on the mandrel is precisely controlled by the pitch control surface at the location where the final ply is applied, the final ply layer can be applied to the tube with the formation of highly precise and predetermined spiral seam having essentially no visible gap, if desired, or having a uniform predetermined gap, or having a uniform overlapped seam. Because the final ply layer is applied downstream of the winding belt, it is not marred by contact with the surface of the winding belt.

In addition to providing spiral wound tubes of improved uniformity, appearance and/or strength, the method and apparatus of the invention can substantially simplify and improve the manufacturing process by providing the practical ability to precisely control the position of the tube and the plies along the mandrel which allows the use of repeatable process start-up conditions and apparatus alignments. In addition the invention can improve and stabilize the uniformity of the angular alignment and the relative axial positioning of the plies during the winding process thereby reducing tension variations within and between plies while also minimizing the need for process adjustments during the winding process.

BRIEF DESCRIPTION OF THE DRAWINGS

In the drawings which form a portion of the original disclosure of the invention:

FIG. 7 illustrates a mandrel having an alternative pitch control surface comprising a movable belt with a high friction surface inset into the mandrel surface along a spirally aligned portion thereof;

FIG. 8 illustrates a partial cross-sectional view of the mandrel shown in FIG. 7, taken along line 8—8 thereof to illustrate details of the pitch control surface thereof; and FIG. 9 is a partial transverse cross-sectional view of a mandrel, a pitch control surface, and a spirally wound tube being formed thereon, similar to FIG. 4 and illustrates one embodiment of the invention wherein the pitch control surface is engaged into a ply gap in the interior most layer of the tube so that the pitch control surface also engages with a portion of the second ply layer.

DETAILED DESCRIPTION OF THE PREFERRED EMBODIMENT

In the following detailed description, preferred embodiments of the invention are described and discussed in detail to enable practice of the invention. It will be apparent that although specific terms are used to describe the preferred embodiments, these are used in the descriptive sense and not for the purpose of limiting the invention thereto. It will also be apparent that the invention is susceptible to a wide variety of changes as will become apparent from a consideration of the preferred embodiments of the invention as shown in the attached drawings and described in detail below.

Figure 1:
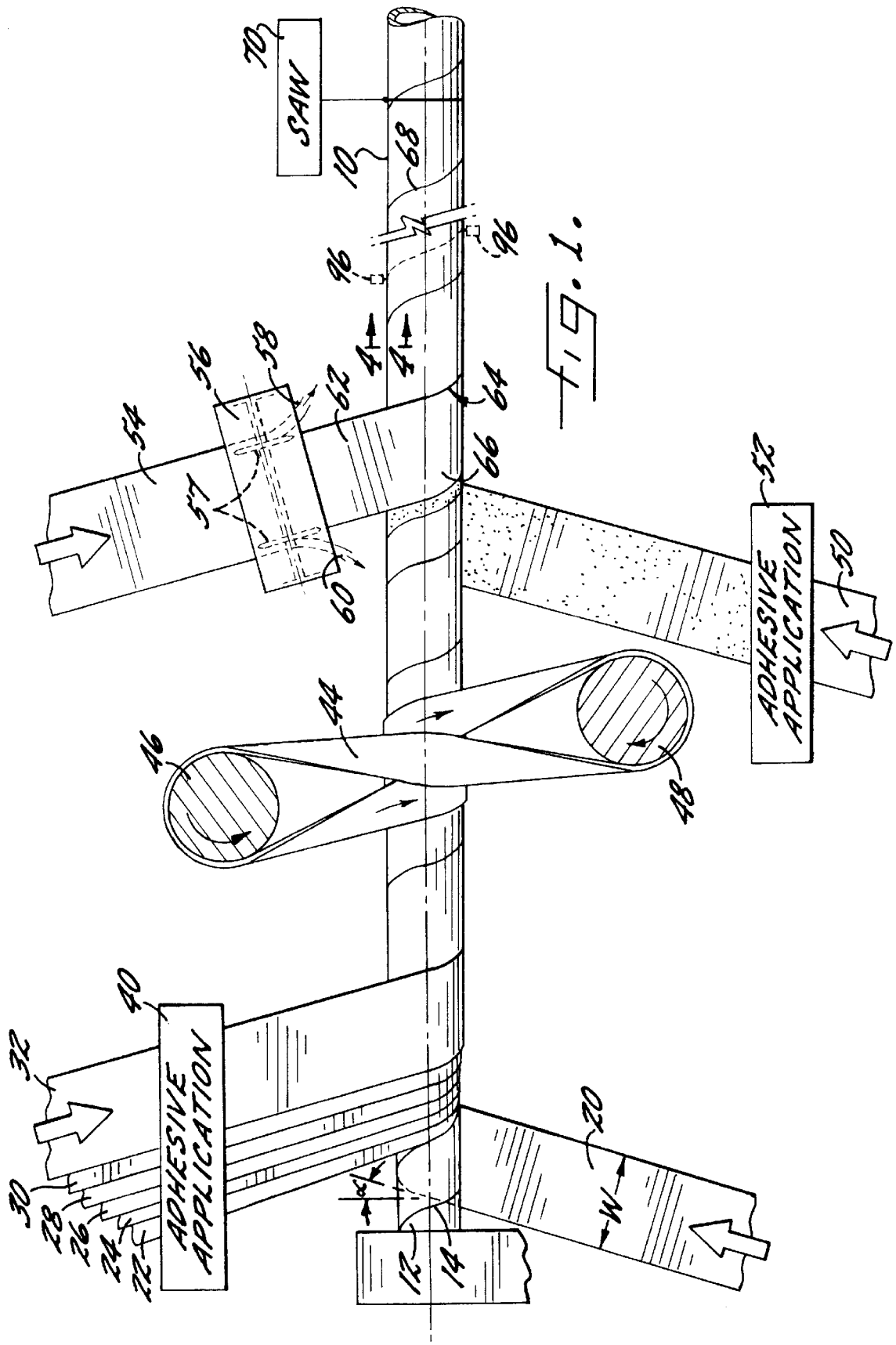
FIG. 1 schematically illustrates one preferred spiral tube-forming process and apparatus according to the invention.

FIG. 1 schematically illustrates a preferred spiral tube-forming process and apparatus of the invention. As seen in FIG. 1, a continuous, spiral wound tube 10 is formed on a stationary mandrel 12 having a spiral thread-like pitch control surface 14 formed thereon as discussed in greater detail below in connection with FIGS. 2, 3, and 4. A first ply 20 having a width W is fed onto the mandrel 12 at a winding angle $\alpha$ which is determined from the winding diameter of the ply, D, and the ply width, W of an ideal, perfectly uniform width and perfectly straight ply 20 by the formula:

$$\sin \alpha = W/\pi D$$

As will be apparent, the above formula is typically corrected to take into account tolerances, i.e., variances from ideal conditions, the intended ply gap or seam overlap, etc. The pitch, P, of the layer formed by ply 20 is then determined by the formula:

$$\text{Pitch} = \tan \alpha (\pi D)$$

It is to be noted that the ideal ply width W and winding angle $\alpha$ change by a small amount from ply layer to ply layer because the winding diameter D of each ply layer becomes successively greater as the wall thickness of the tube 10 is built up by each successive layer. However, the pitch of each ply layer must be the same since each ply layer must move the same axial distance along the mandrel for each revolution of the tube 10 on the mandrel. Accordingly, the ply width W and the winding angle $\alpha$ for all of the ply layers are calculated to maintain pitch P constant.

The ply 20 can be formed of paperboard, polymer film, metal foil or a similar continuous sheet material, as will be apparent to those of skill in the art. The ply 20 can also be formed of composite or multiple layered sheet materials such as a paper/film laminate; a paper/foil laminate; a film/foil laminate; a paper/film/foil laminate, and the like.

A plurality of plies, 22, 24, 26, 28, 30, and 32, which, like ply 20, can be formed of various sheet materials including paperboard, polymer film, metal foil, or laminates, are coated with an adhesive at a conventional adhesive coating station 40 and are superimposed in radially layered relationship onto the interior most ply layer 20. No adhesive is applied to the exterior face of the outer paperboard ply 32. It is preferred to apply adhesive to both the interior and exterior face of the paperboard ply 22 which contacts the innermost paperboard ply layer 20.

The radially layered plies are spirally wound onto and advanced axially along the mandrel by the action of a continuous winding belt 44 which is driven at a predetermined winding angle alpha by winding drums 46 and 48 as is well known in the art. At a location downstream of the winding belt 44, a paperboard ply 50 is coated on both faces with adhesive via an adhesive station 52 and is thereafter spirally wound onto the partially formed tube 10 exiting the drive belt 44. A final, exterior paperboard layer 54 is preferably passed through an in-line slitting apparatus 56 which comprises two pairs of radial shear blades 57, each pair of blades including one blade above and one blade below the web. The blades 57 remove a portion 58 and/or a portion 60 of one or both edges of the ply 54 prior to the application of the ply to the tube 10 surface. The trimmed ply 62 exiting the in-line slitter is applied to the adhesive coated surface of paperboard ply 50 to thereby form the final exterior layer of the tube 10. The leading and trailing edges 64 and 66, respectively, of the exterior ply 62 are laid adjacent, and preferably in edge contacting relation to each other, to form a spiral seam 68 which can be visible or nearly invisible upon the surface of the final tube 10, depending on the gap or overlap at seam 68, which can be precisely controlled according to the present invention. The continuous tube 10 is moved axially along, and past the end of the mandrel where it is cut by one or more cutting stations 70, typically in the form of radial saws or in the form of any of various tube cutting apparatus that will be known to those skilled in the art.

Figure 2:
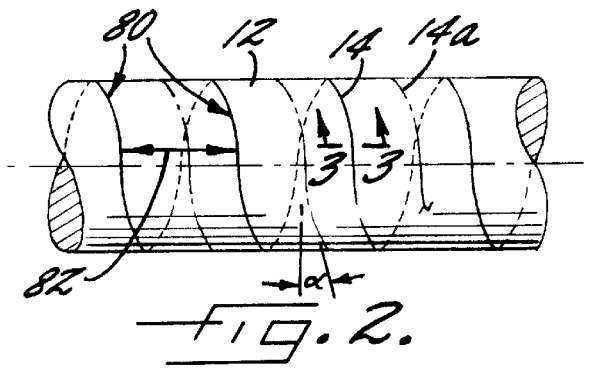
FIG. 2 illustrates a portion of one preferred surface of the mandrel of FIG. 1 comprising the pitch control surface of the mandrel.
Figure 3:
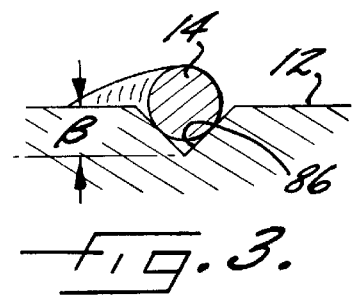
FIG. 3 illustrates a partial cross-sectional view of the mandrel segment shown in FIG. 2, taken along line 3—3 thereof to illustrate a wire attached to a groove in the mandrel surface by tack welding or a different process that anchors the wire in the groove.

FIGS. 2 and 3 illustrate one preferred spiral pitch control surface that can be formed on the mandrel 12 shown in FIG. 1. The pitch control surface shown in FIG. 2 is formed by at least one continuous spiral thread-like protrusion, 14, which is fixedly or removeably attached to the exterior surface of the mandrel 12 along a predetermined spirally aligned path which forms a predetermined spiral wind angle $\alpha$ with respect to the surface of the mandrel 12. The protrusion 14 is preferably formed on the mandrel along a sufficient spirally linear path i.e., a linear path forming a spiral line and not a straight line, to form a plurality of turns or flights 80 which are spaced from each other at a predetermined pitch 82 as illustrated in FIG. 2. The continuous protrusion 14 extends radially outward of the surface of the mandrel 12 as best seen in FIG. 3. In one preferred embodiment of the invention, the protrusion 14 can be formed by a wire which is removeably or permanently attached into a groove 86 formed in the surface of the mandrel. The groove is formed into the mandrel at a depth which is sufficient to restrain the wire 14 against movement out of the groove 86 while also allowing at least a portion of the wire 14 to extend above, i.e., radially outwardly of, the surface of the mandrel 12. If desired, a plurality of spirally parallel protuberances 14 and 14A (illustrated in FIG. 2) can be formed on the surface of the mandrel 12.

Figure 4:
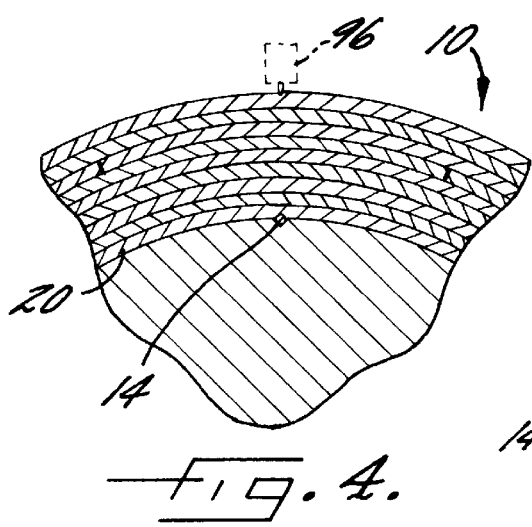
FIG. 4 is a partial transverse cross-sectional view taken along line 4—4 of FIG. 1 and illustrates a portion of the mandrel, the pitch control surface, and the spirally wound tube formed thereon.

As illustrated in FIG. 4, the pitch control surface 14 engages and forms a small indentation in the interior surface of the innermost ply 20 as the tube 10 advances along the mandrel. Because the pitch control surface is a spirally aligned surface, the pitch control surface guides the rotation of the tube 10 along a predetermined spiral rotation path, and, under normal circumstances, causes only a minor increase in friction between the tube 10 and the mandrel. However when an axial force is applied to the tube 10 as it is being formed on the mandrel, as a result of engagement, for example, of the tube 10 with the saw 70, or for example, as a result of variation in the tension or direction of the force applied to the tube 10 by the winding belt 44, the pitch control surface 14 applies a countervailing force that constrains the axial movement of the tube 10 on the surface of the mandrel to the axial movement corresponding to the spiral rotation defined by the spiral pitch control surface 14. Similarly if the rotational force applied to the tube 10 changes due to, for example, a variation in the speed or direction of the force applied to the tube 10 by the winding belt 44, the pitch control surface 14 applies a countervailing force that constrains the rotation of the tube 10 on the surface of the mandrel to a rotation corresponding to the spiral rotation defined by the spiral pitch control surface 14.

The constraining force applied to the tube 10 by the pitch control surface is determined by various aspects of the construction and arrangement of the pitch control surface 14 including the length of the pitch control surface 14; the extent or the depth of radial engagement of the pitch control surface 14 into the interior surface of the tube 10; the transverse or width dimension of the pitch control surface 14, and by the frictional characteristics of the pitch control surface 14, as will be apparent. Thus the construction of the pitch control surface 14 can be widely varied to provide a pitch control surface 14 in accord with the invention, capable of substantially constraining the movement of the tube 10 along the mandrel 12 to a spiral rotation corresponding to the spiral alignment of the pitch control surface 14 despite numerous force variations that are applied to the tube 10 under normal tube manufacturing conditions.

When a continuous pitch control surface of the type illustrated in FIGS. 2 and 3 is employed in accordance with the invention, the wire surface can extend radially outwardly of the surface of the mandrel for only a small distance, for example, between about 0.1 mm and about 2 mm, while applying a force capable of substantially constraining the movement of the tube 10 along the mandrel 12 to a spiral rotation corresponding to the spiral alignment of the pitch control surface 14. In various advantageous embodiments of the invention the wire surface extends radially outwardly of the surface of the mandrel 12 for a distance of less than about 0.5 mm so that the tube 10 formed in accordance with the invention will have a barely visible or nearly invisible spiral indentation formed on its interior. Nevertheless, even when the wire extends into and/or forms a substantial indentation in the interior surface if the tube 10, the exterior of the tube 10 can be completely smooth with a highly uniform spiral seam.

Figure 5:
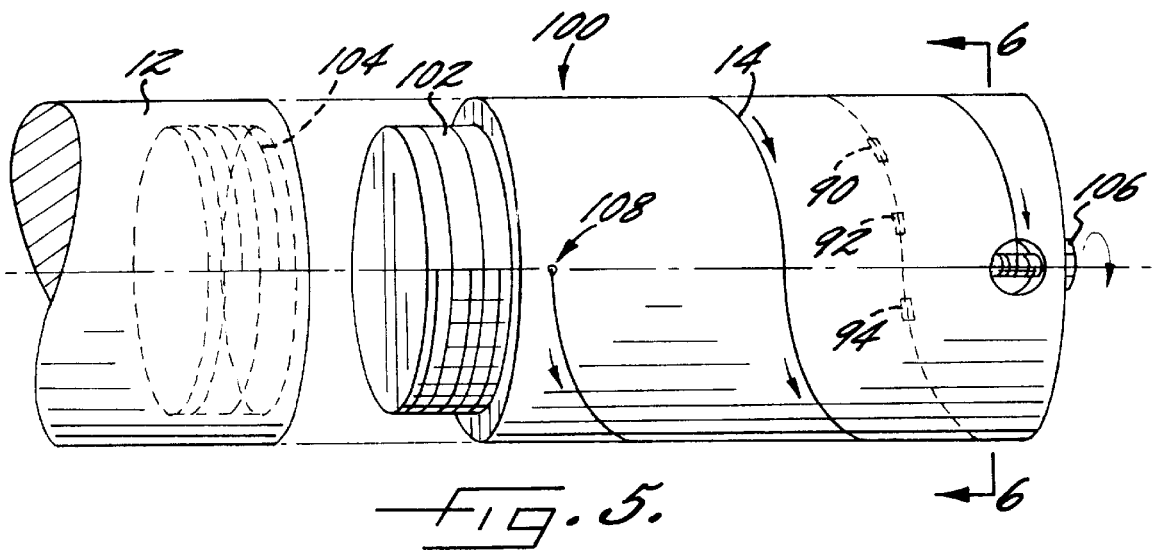
FIG. 5 illustrates one preferred pitch control mandrel extension according to the invention in an exploded view and also illustrates an end portion of a spiral tube forming mandrel.

Although in one advantageous embodiment of the invention as illustrated in FIGS. 2, 3 and 4, the pitch control surface 14 is a continuous protrusion or spiral thread-like surface formed on the exterior of the mandrel 12, the pitch control surface can alternatively be formed by a plurality of discrete protrusions aligned along a predetermined spiral portion of the mandrel surface, such as, for example, protrusions 90, 92 and 94 illustrated in FIG. 5. Alternatively, the pitch control surface can be provided by one or a plurality of spirally oriented grooves formed in the surface of the mandrel, such as groove 86 illustrated in FIG. 3.

Although it is also preferred that the pitch control surface extend axially along the mandrel 12 for a distance defining at least one or more complete spiral revolutions, or flights, around the pitch control surface 14, highly effective pitch control can alternatively be achieved in accordance with the invention, employing a pitch control surface extending less than a full spiral revolution or flight around the surface of the mandrel. For example, a continuous or discontinuous, spirally aligned pitch control surface 14 can extend along the mandrel 12 for a distance defining a helical arc of from about 10°–45° depending upon the degree of engagement between the pitch control surface and the inside surface of the spirally wound tube 10 and on the mandrel diameter, while forming a highly effective pitch control surface 14.

In yet another preferred embodiment of the invention, the pitch control surfaces can be applied to the exterior of the tube 10 during the tube forming process by a continuous exterior tube surface-engaging member or by a plurality of spirally aligned exterior tube surface-engaging members. An exterior surface pitch control surface, formed by a plurality of discrete, spirally aligned surface engaging members 96 are illustrated in FIGS. 1 and 4. As will be seen, a plurality of pin-like or rotatable wheel-like surfaces can be contacted with the exterior rotating surface of the spirally wound tube 10 during the tube forming process in order to apply pitch control thereto. Alternatively a continuous exterior pitch control surface (not shown) formed on the interior surface of a cylindrical, female die, can be applied to the tube exterior during the tube forming process. Such a female die preferably comprises a spirally aligned continuous protrusion on its interior surface.

Figure 6:
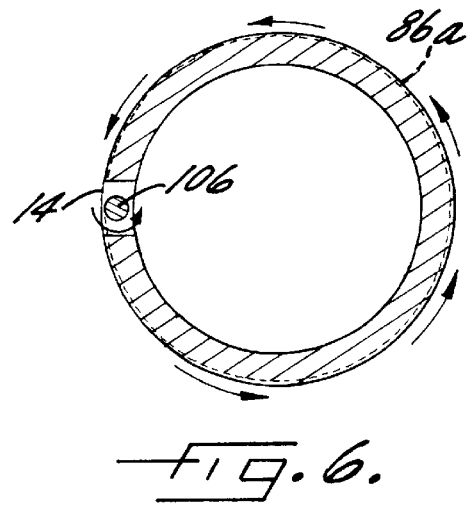
FIG. 6 is a transverse cross-sectional view taken along line 6—6 of FIG. 5 and illustrates one preferred apparatus for engaging a wire along a spiral surface of the mandrel extension of FIG. 5 using the application of tension to the wire

FIGS. 5 and 6 illustrate an embodiment of the invention in which the cylindrical mandrel is formed from two axially aligned mandrel body portions including a cylindrical mandrel extension 100 and an upstream mandrel body which is preferably the conventional mandrel 12. The cylindrical mandrel extension 100 is releasably attached in axial alignment to the downstream end of the conventional mandrel 12 by means of spiral threads 102 and 104 provided on the ends of the mandrel 12 and the mandrel extension 100. The spiral threads 102 and 104 which connect the mandrel 12 and the mandrel extension 100 are oriented for rotation in a direction opposite the direction of rotation of the tube 10 as it is formed on the mandrel 12. Accordingly, rotation of the tube 10 on the mandrel 12 and mandrel extension 100 does not loosen the connection between the mandrel 12 and mandrel extension 100.

In the embodiment of the invention illustrated in FIGS. 5 and 6 a pitch control surface 14 is formed on the surface of the mandrel extension 100 by means of a wire 14 which is releasably secured by tension into the surface of a groove 86A formed along a predetermined spiral path in the surface of the mandrel extension 100. The tension is applied to the wire 14 by means of a tension applying member 106. A first end of the wire 14 may be secured into an orifice 108 formed radially into the surface of the mandrel extension member 100. The other end of the wire 14 is then secured to a rotatable tension applying member 106 which is rotated to apply tension to the wire 14 to thereby releasably secure same into a spiral groove formed in the surface of the mandrel extension 100.

The mandrel extension member 100 allows pitch control surfaces of varying angles, and thus, varying pitches, to be applied to a single tube-forming mandrel in order to accommodate the manufacture of spirally wound tubes from different paper widths on the single mandrel. As will be apparent to those skilled in the art, the helical angle of wind will vary depending upon the paper width used for forming the tube 10 according to the formula discussed previously. It is also contemplated that a permanent or removable pitch control surface can be applied to a conventional tube-forming mandrel by the use of an exterior attachment to the mandrel in the form of a permanently attached or removeably attached one-piece, or cylindrically wound, sleeve or partial sleeve (not shown) formed of metal, plastic, or the like, and which includes an exterior pitch control surface. Such a sleeve or partial sleeve can be applied to the exterior of the surface of the mandrel, e.g. by shrink fitting, by adhesive attachment or the like.

FIGS. 7 and 8 illustrate a mandrel 12 having an alternative pitch control surface comprising an endless movable belt 14B with a high friction exterior surface. The movable belt 14B is inset into the surface of the mandrel 12 along a spirally aligned portion thereof and is supported for movement by a plurality of roller bearings 120 or the like. The high friction surface of the moveable belt 14B engages the interior surface of a spirally wound tube as it is formed on the mandrel 12, without forming an indentation in the interior surface of the tube. Because of the spiral alignment of the belt 14B and its high friction surface, the belt 14B constrains the movement of a tube formed on the mandrel to the spiral rotation corresponding to the spiral alignment of the belt 14B.

FIG. 9 illustrates another embodiment of the invention wherein the pitch control surface 14C engages the interior surface of a spirally wound tube as it is formed on the mandrel 12, without forming an indentation in the interior surface of the tube. The pitch control surface 14C is similar to the pitch control surface 14 illustrated in FIG. 4; however the diameter of the wire 14C exceeds that of the pitch control surface 14 illustrated in FIG. 4. Accordingly the wire 14C extends outwardly of the mandrel surface to a greater extent than the pitch control surface 14. As seen in FIG. 9, the pitch control surface 14C is supported on the mandrel in a groove 86C and extends outwardly of the mandrel 12 into a ply gap in the interior most layer formed by ply 20 of the tube 10 so that the pitch control surface also engages with a portion of the ply layer formed by the second ply 22.

Returning now to FIG. 1, it will be apparent that numerous changes and modifications to the apparatus and sequence of operations illustrated can be effected within the scope of the invention. Thus, the spirally wound tube 10 can be formed from any of varying numbers of plies. In addition, any number of plies can be applied upstream of the winder and/or downstream of the winder, and the manner that the plies are fed onto the mandrel and/or the apparatus used to feed the plies to the mandrel can be widely varied. If desired, adhesive can be applied to the first ply 20 prior to its application to the mandrel 12. Moreover, varying types of adhesive can be employed as will be apparent; thus, the adhesive can be applied by dipping, spraying, rolling and/or thermally activatable adhesives can be employed if desired. In addition, it will be apparent that although a single winding belt is shown in FIG. 1, a plurality of winding belts, for example, two winding belts or three winding belts, etc., can be readily be used in the invention. Still further, the mandrel 12 can be tapered slightly if desired, particularly at its downstream end, in order to decrease friction between the tube and the mandrel. In this regard, the term "cylindrical mandrel" as used herein, is intended to include such tapered mandrels.

The in-line slitter 56 shown in FIG. 1 is particularly desirable for forming a highly uniform spiral seam. In this regard, the in-line edge cutting blades 57 are believed to function both as guides and blades during the application of the ply 62 to the 10. Advantageously the lateral spacing between the in-line slitter 56 and the tube 10 is minimized in order to improve the precision of the alignment of the ply on the tube 10. Although cutting blades 57 are illustrated in FIG. 1, the in-line slitter 56 can employ alternative cutting elements based on lasers, water jets, or the like. Additionally, it is to be noted that an in-line slitter 56 can be used in conjunction with one or more selected plies other than, or in addition to, the final ply 62.

The use of exterior pitch control surfaces 96 is generally considered an alternative to the pitch control surfaces associated with the surface of the mandrel 12; however, external pitch control surfaces may be used in combination with the mandrel pitch control surfaces 14 formed on the mandrel if desired.

In one advantageous embodiment of the invention, the pitch control surface or surfaces 14 are applied to the surface of the tube 10 at a location axially corresponding to, or a location axially adjacent the location at which a ply having the maximum desired seam uniformity, such as the final paperboard ply 62, is applied to the tube 10. Thus, in the arrangement shown in FIG. 1, a pitch control surface on the mandrel 12 is particularly desirably located at an axial location along the mandrel 12 which is closely adjacent or aligned with the axial location of the ply slitter 56, in order to maximize the uniformity of the seam formed by the ply 62. In the event that the final exterior ply 62 is applied upstream of the winding belt 44, alignment of the ply 62 on the tube 10 can thus be further enhanced by a pitch control surface 14 upstream of the winder.

As will be apparent from the forgoing, pitch control can be applied to the surface of the tube 10 at any of various locations along the mandrel 12, or at a plurality of locations along the mandrel 12.

It is further contemplated that the winding angle and pitch length of a pitch control surface can be variable in some apparatus embodiments of the invention by application of a pitch control surface to a mandrel or mandrel extension that is constructed to be expandable or collapsible in the axial direction. In such instances, the pitch of the pitch control surface is adjusted as the mandrel changes in length, just as the pitch of a helical spring changes as the spring is compressed or stretched.

Spirally wound tubes prepared according to the invention can exhibit substantially improved ply uniformity as will be apparent from the foregoing. Spirally wound tubes according to the invention can readily be prepared with a seam gap uniformity less than about, plus or minus 0.50 mm (±0.50 mm), variations in the seam gap of one or more of the ply making up the spirally wound tube. In highly advantageous embodiments of the invention, spirally wound tubes can be prepared having a seam uniformity such that the seam variation is less than plus or minus 0.25 mm (±0.25 mm) in at least one of the plies forming the spirally wound tube. In this regard, it is to be noted that a spiral seam uniformity such that the seam variation is less than plus or minus 0.25 mm is generally not possible to be maintained throughout a conventional high speed spiral winding manufacturing process except by use of extremely low manufacturing speeds or other undesirable variations. Typically, the tubes manufactured according to the invention can have a spiral indentation on their interior surface as discussed previously in connection with FIG. 4.

The invention has been described in considerable detail with particular reference to preferred embodiments. However, numerous variations and modifications can be made without departing from the spirit and scope of the invention as described in the foregoing specification and shown in the drawings and defined in the following claims.

That which is claimed is:

1. An apparatus for manufacturing spirally wound tubes of substantially uniform exterior and interior diameter and enhanced spiral seam uniformity comprising:

a stationary cylindrical mandrel for receiving a plurality of continuous plies in superimposed radially layered relationship on a surface of said mandrel;

a winder comprising a drive belt operatively associated with said mandrel for spirally rotating said plies on said mandrel at a predetermined spiral wind angle to form a spirally wound tube therefrom; and a spiral pitch control surface comprising a spirally aligned tube engaging surface formed as a protrusion operatively associated with said mandrel, said spiral pitch control surface being aligned along the predetermined spiral wind angle and positioned to engage an interior or exterior cylindrical surface of said spirally wound tube along a spirally aligned portion thereof to substantially constrain movement of the spirally wound tube to the spiral angle of said spiral pitch control surface as the tube is formed on said mandrel.

2. The apparatus of claim 1 wherein said spiral pitch control surface comprises a wire replaceably secured within a groove formed in the surface of said stationary cylindrical mandrel.

3. The apparatus of claim 1 wherein said spiral pitch control surface on said stationary cylindrical mandrel comprises a spiral thread-like surface extending at least one flight along the surface of said mandrel.

4. The apparatus of claim 1 wherein said spiral pitch control surface on said stationary cylindrical mandrel comprises a spiral thread-like surface extending less than one full flight along the surface of said cylindrical mandrel.

5. The apparatus of claim 1 wherein said spiral pitch control surface comprises a plurality of discrete, spirally aligned protuberances extending radially outwardly of the surface of said cylindrical mandrel.

6. The apparatus of claim 1 wherein said tube engaging surface on said cylindrical mandrel is positioned on said mandrel surface on a portion of said mandrel surface comprising a position downstream of said drive belt.

7. The apparatus of claim 1 wherein said tube engaging surface on said cylindrical mandrel is positioned on said mandrel surface on a portion of said mandrel surface comprising a position upstream of said drive belt.

8. The apparatus of claim 1 wherein said tube engaging surface on said cylindrical mandrel is positioned on said mandrel surface on a portion of said mandrel surface comprising a position axially adjacent said drive belt.

9. The apparatus of claim 1 further comprising at least one paperboard ply feeder positioned downstream of said drive belt for feeding a continuous ply onto said tube to form the exterior layer of said tube.

10. The apparatus of claim 9 wherein said paperboard ply feeder comprises at least one blade for cutting at least one edge of the paperboard ply fed onto said paperboard tube by said paperboard ply feeder.

11. The apparatus of claim 1 wherein said spiral pitch control surface is positioned along the surface of a cylindrical mandrel extension releasably attached to a downstream end of said stationary cylindrical mandrel in axial alignment therewith.

12. The apparatus of claim 11 wherein said spiral pitch control surface defines a tube rotation direction and said cylindrical mandrel extension is attached to said stationary cylindrical mandrel by threaded surfaces formed on each of said cylindrical mandrel extension and said stationary cylindrical mandrel, and wherein said threaded surfaces define a rotation direction that is opposed to the tube rotation direction.

13. The apparatus of claim 1 wherein said spiral pitch control surface on said stationary cylindrical mandrel comprises a freely movable belt with a high friction exterior surface inset into the surface of the mandrel along a spirally aligned portion thereof, the belt being freely movable with respect to said winder.

14. An apparatus for spiral winding of a plurality of continuous plies to form a tube of substantially uniform exterior and interior diameter and enhanced spiral seam uniformity comprising:

a stationary cylindrical mandrel of predetermined diameter;

a ply feeder for feeding a plurality of continuous plies of predetermined width in superimposed radially layered relationship onto said cylindrical mandrel;

a winder comprising a drive belt operatively associated with said mandrel for spirally rotating said continuous plies on said mandrel at a spiral wind angle based on said predetermined diameter of said cylindrical mandrel and said predetermined width of said continuous plies, to form a spirally wound tube therefrom; and a spiral pitch control surface comprising a tube engaging surface formed as a protrusion from the surface of said mandrel, said spiral pitch control surface being aligned along the spiral wind angle and positioned on the surface of said stationary mandrel along a spirally aligned portion of said mandrel to substantially constrain movement of the spirally wound tube to a spiral rotation corresponding to the spiral wind angle of said spiral pitch control surface as the tube is formed on said mandrel.

15. The apparatus of claim 14 wherein said spiral pitch control surface on said stationary cylindrical mandrel comprises a spiral, continuous thread-like protrusion extending at least one flight along the surface of said mandrel.

16. The apparatus of claim 14 wherein said spiral pitch control surface on said stationary cylindrical mandrel comprises a continuous, spiral thread-like protrusion extending less than one full flight along the surface of said cylindrical mandrel.

17. The apparatus of claim 14 wherein said spiral pitch control surface comprises a plurality of discrete, spirally aligned protrusions extending radially outwardly of the surface of said cylindrical mandrel.

18. The apparatus of claim 14 wherein said tube engaging surface on said cylindrical mandrel is positioned on said mandrel surface on a portion of said mandrel surface comprising a position downstream of said drive belt.

19. The apparatus of claim 14 wherein said tube engaging surface on said cylindrical mandrel is positioned on said mandrel surface on a portion of said mandrel surface comprising a position upstream of said drive belt.

20. The apparatus of claim 14 wherein said tube engaging surface on said cylindrical mandrel is positioned on said mandrel surface on a portion of said mandrel surface comprising a position axially adjacent said drive belt.

21. The apparatus of claim 14 further comprising a paperboard ply feeder positioned downstream of said drive belt for feeding a continuous paperboard ply onto said spirally wound tube to form the exterior layer of said spirally wound tube.

22. The apparatus of claim 21 wherein said paperboard ply feeder comprises a at least one knife blade for cutting at least one edge of the paperboard ply fed onto said paperboard tube by said paperboard ply feeder positioned downstream of said drive belt.

23. The apparatus of claim 14 wherein said cylindrical mandrel comprises at least two axially aligned portions including an upstream mandrel body and a cylindrical mandrel extension releasably attached to a downstream end of said upstream mandrel body, and wherein said spiral pitch control surface is positioned along the surface of said cylindrical mandrel extension.

24. The apparatus of claim 23 wherein said spiral pitch control surface defines a tube rotation direction and said axially aligned portions of said mandrel are connected by threaded surfaces formed on each of said mandrel portions, and wherein said threaded surfaces define a rotation direction that is opposed to the tube rotation direction.

25. The apparatus of claim 14 wherein said spiral pitch control surface on said stationary cylindrical mandrel comprises a movable belt with a high friction exterior surface inset into the surface of the mandrel along a spirally aligned portion thereof.

26. A method for production of a spirally wound tube of substantially uniform exterior and interior diameter and enhanced spiral seam uniformity comprising the steps:

feeding a plurality of continuous plies of predetermined width in superimposed radially layered relationship onto a cylindrical mandrel of predetermined diameter;

spirally rotating said plies on said mandrel at a winding pitch based on said predetermined diameter of said cylindrical mandrel and said predetermined widths of said continuous plies, to form a spirally wound tube; and engaging an exterior or interior cylindrical surface of said spirally wound tube with a spiral pitch control surface comprising a tube engaging surface formed as a protrusion operatively associated with said mandrel and aligned at said spiral wind angle to substantially constrain movement of the spirally wound tube to a spiral rotation corresponding to said spiral pitch control surface as the tube is formed on said mandrel.

27. The method of claim 26 wherein said spiral pitch control surface is positioned along the surface of said stationary cylindrical mandrel.

28. The method of claim 26 wherein said spiral pitch control surface on said stationary cylindrical mandrel comprises a spiral thread-like surface extending at least one flight along the surface of said mandrel.

29. The method of claim 27 wherein said spiral pitch control surface on said stationary cylindrical mandrel comprises a spiral thread-like surface extending less than one full flight along the surface of said cylindrical mandrel.

30. The method of claim 27 wherein said spiral pitch control surface comprises a plurality of discrete, spirally aligned protuberances extending radially outwardly of the surface of said cylindrical mandrel.

31. The method of claim 27 wherein said tube engaging surface on said cylindrical mandrel is positioned on said mandrel surface on a portion of said mandrel surface comprising a position downstream of said drive belt.

32. The method of claim 27 wherein said tube engaging surface on said cylindrical mandrel is positioned on said mandrel surface on a portion of said mandrel surface comprising a position upstream of said drive belt.

33. The method of claim 27 wherein said tube engaging surface on said cylindrical mandrel is positioned on said mandrel surface on a portion of said mandrel surface comprising a position axially adjacent said drive belt.

34. The method of claim 27 wherein said step of spirally rotating said paperboard plies on said mandrel comprises the step of contacting an exterior surface of said paperboard plies with a rotating drive belt operatively associated with said mandrel.

35. The method of claim 34 further comprising the step of feeding a paperboard ply onto said tube at a location downstream of said drive belt to form the exterior layer of said tube.

36. The method of claim 34 further comprising the step of cutting at least one edge of the ply fed onto said tube at said location downstream of said drive belt while feeding said ply onto said tube.

37. The method of claim 27 wherein said spiral pitch control surface on said stationary cylindrical mandrel comprises a spiral thread-like surface extending outwardly of said mandrel surface for a distance exceeding the thickness of a first of said plurality of plies wound onto said mandrel.

38. A spirally wound rigid tube of substantially uniform exterior and interior diameter and enhanced spiral seam uniformity comprising a plurality of spirally wound layers comprising at least one interior spirally wound layer and one exterior spirally wound layer, said interior spirally wound layer having a continuous spiral indentation formed into the surface thereof.

39. The spirally wound tube of claim 38 wherein at least one spirally wound layer of said tube has a seam uniformity of less than about ±0.50 mm.

40. The spirally wound paperboard tube of claim 39 wherein at least one ply of said paperboard tube has a spiral seam uniformity of less than about ±0.25 mm.

* * * * *

UNITED STATES PATENT AND TRADEMARK OFFICE
CERTIFICATE OF CORRECTION

PATENT NO. : 5,833,592

DATED : November 10, 1998

INVENTOR(S) : Howard et al.

It is certified that error appears in the above-identified patent and that said Letters Patent is hereby corrected as shown below:

On the title page, item [54]

"UNIFORITY" should read --UNIFORMITY--.

--Item [76] :
In the References Cited, U.S. Patent Documents,

Line 8, "Aherg" should read --Aberg--;
Line 10, "Gartaganis" should read --Gartaganis et al.--;
Line 15, "Drummond" should read --Drummond et al.--.

Column 1, line 2, in the title, "UNIFORITY" should read --UNIFORMITY--.

Column 14, Delete Claims 38, 39, and 40.

Signed and Sealed this

Thirteenth Day of July, 1999

Attest:

Attesting Officer

Q. TODD DICKINSON

Acting Commissioner of Patents and Trademarks